P. O. McNICOL.
HORSE RELEASER.
APPLICATION FILED JULY 27, 1908.
906,266.
Patented Dec. 8, 1908.
2 SHEETS—SHEET 1.
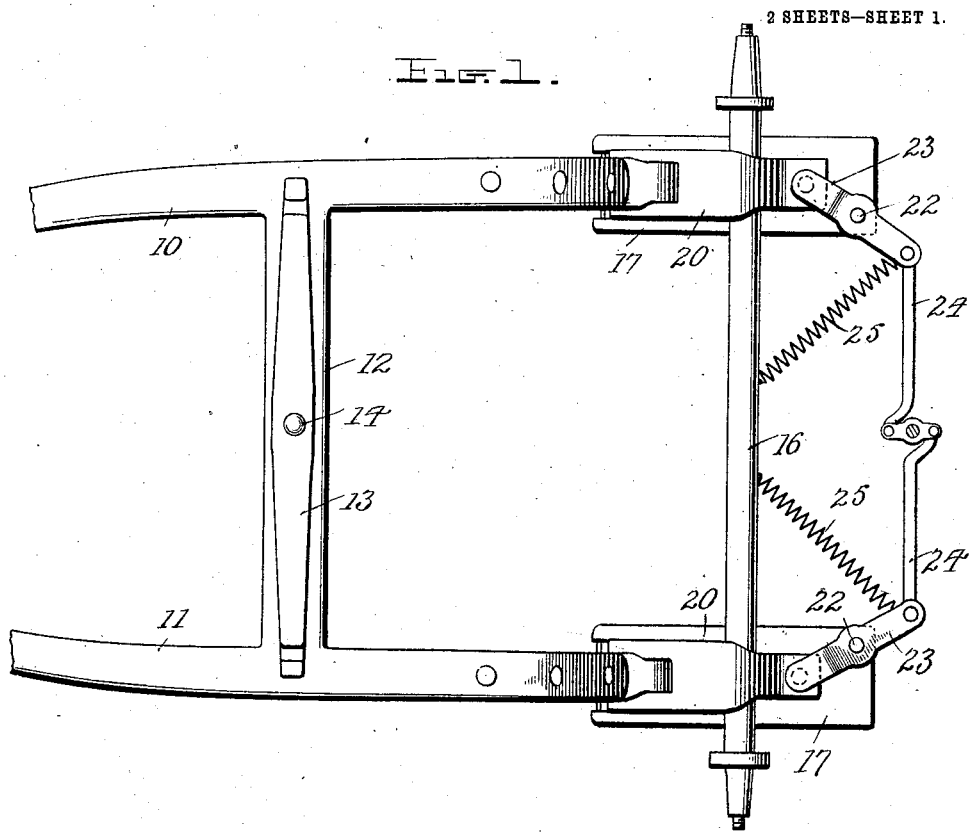
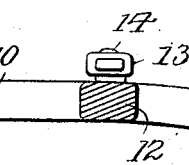
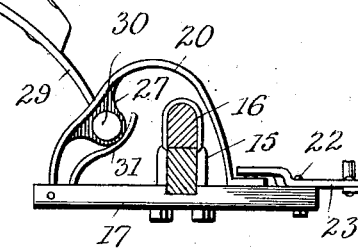
Witnesses
Inventor
Pearl O. McNicol
By
Attorneys P. O. McNICOL.
HORSE RELEASER.
APPLICATION FILED JULY 27, 1908.
906,266.
Patented Dec. 8, 1908.
2 SHEETS—SHEET 2.
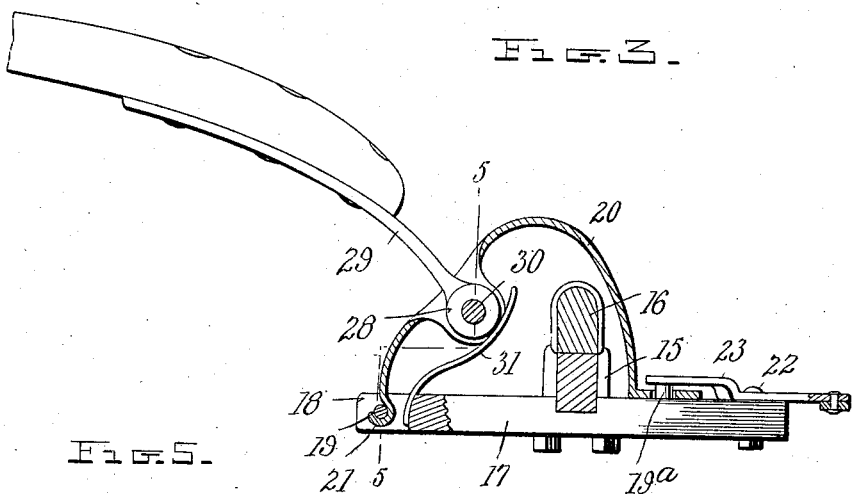
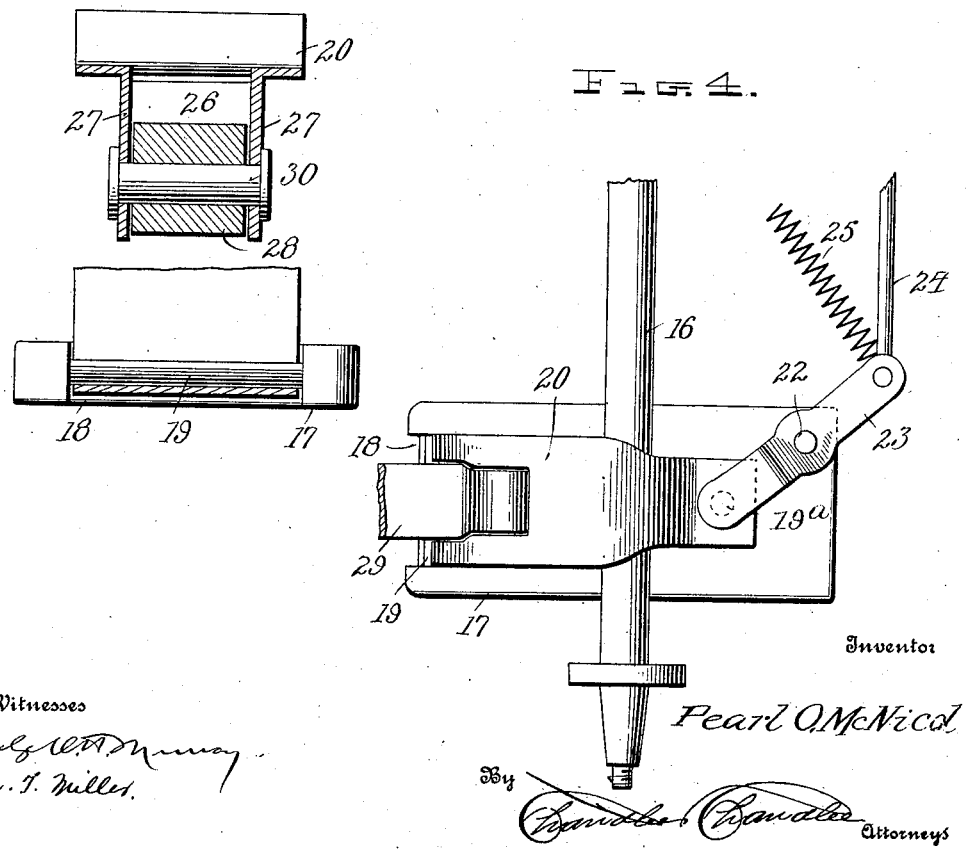
Witnesses
Inventor
Pearl O. McNicol
By
Attorneys

UNITED STATES PATENT OFFICE.

PEARL O. McNICOL, OF EUREKA, KANSAS.

HORSE-RELEASER.

No. 906,266.　　　Specification of Letters Patent.　　　Patented Dec. 8, 1908.

Application filed July 27, 1908. Serial No. 445,557.

*To all whom it may concern:*

Be it known that I, PEARL O. McNICOL, a citizen of the United States, residing at Eureka, in the county of Greenwood, State of Kansas, have invented certain new and useful Improvements in Horse-Releasers; and I do hereby declare the following to be a full, clear, and exact description of the invention, such as will enable others skilled in the art to which it appertains to make and use the same.

This invention relates to devices for instantly releasing horses from vehicles in event of their running away or becoming unruly, and has for one of its objects to simplify and improve the construction and increase the efficiency and utility of devices of this character.

Another object of the invention is to produce a simply constructed device whereby the thills or pole may be instantly released from the axle by the driver when occasion requires.

With these and other objects in view the invention consists in spaced clip devices connected to the axle, clamps connected to the clips and having means for coupling the thills or the pole shackles thereto, and locking devices connected to the clamps and under the control of the driver, whereby the clamping devices may be instantly released when required.

The invention further consists in certain novel features of construction as hereafter shown and described, and then specifically pointed out in the claim, and in the drawings illustrating the preferred embodiment of the invention, Figure 1 is a plan view of the rear portions of a pair of thills including the cross bar and the forward axle with the improved releasing device connected thereto. Fig. 2 is a side elevation of the same. Fig. 3 is an enlarged sectional detail of the axle and thills illustrating more fully the construction of one of the improved devices. Fig. 4 is a plan view of the parts shown in Fig. 3. Fig. 5 is a transverse section on the line 5—5 of Fig. 3.

The improved device is adapted to be applied to a single vehicle or a double vehicle, as required, but for the purpose of illustration is shown applied to an ordinary single horse device, and in the illustration the thills are indicated respectively at 10—11 and the cross bar at 12 with the whiffle-tree 13 pivoted at 14 centrally thereof to the cross bar.

Attached by clips 15 to the axle 16 are two base members 17 preferably with recesses to bear over the lower face of the axle. The members 17 are located where the ordinary thill or tongue clips are located, and replace the same. Each of the members 17 and its attachments being substantially alike, the description of one will suffice for both. Formed in the outer end of each base member is a recess 18 provided with a transverse pin 19 and projecting from each base member rearwardly of the axle is a pin $19^a$. Bearing over the axle at each of the base members 17 is a clamp member 20 having an aperture at the inner end engaging over the pin $19^a$ and with a curved portion 21 at the outer end engaging behind the pin 19, as shown. Pivoted at 22 to each base member 17 is a lock lever 23 each bearing by one end over one of the pins $19^a$, and coupled at their free ends by rods 24, the rods connected at their free ends to a double operating crank. Springs 25 are coupled to the levers 23, and thus exert their force to hold the lock levers yieldably in closed position, as hereafter explained.

Formed in each of the clamp members 20 is a socket 26 having inwardly depending apertured ears 27, the sockets to receive the head portions 28 of the thill or shaft shackles or irons 29, and in which they are swingingly connected by pins 30. Anti-rattle springs 31 are also connected to the clamp members 20 and bear against the heads 28. By this simple arrangement the tongue or the thills are securely coupled to the axle, and so long as the horse or horses act normally they will remain coupled to the vehicle, but in event of becoming unruly or attempting to run away, the driver by simply operating the double crank member can instantly withdraw the trip levers and release the clamp members 20 together with the thills or tongue coupled thereto and thus separate the draft appliances from the vehicle.

The device is simple in construction, can be inexpensively manufactured and applied without structural changes to any of the various vehicles manufactured.

What is claimed, is:—

In a horse releaser, base members having means for attachment to an axle and with stop pins at their forward ends and trip pins at their rear ends, clamp members having sockets with which draft appliances are adapted to be coupled and detachably engaging said stop pins at one end and engaging over said trip pins at the other ends, trip levers swinging from said base members and bearing over said trip pins and retaining the clamp members connected thereto, and means under the control of the driver for actuating said trip levers.

In testimony whereof, I affix my signature, in presence of two witnesses.

PEARL O. McNICOL.

Witnesses:
W. J. BILSON,
W. B. McNICOL.